(12) United States Patent
Golle et al.

(10) Patent No.: US 7,783,899 B2
(45) Date of Patent: Aug. 24, 2010

(54) SYSTEM AND METHOD FOR PERFORMING A CONJUNCTIVE KEYWORD SEARCH OVER ENCRYPTED DATA

(75) Inventors: Philippe Golle, San Francisco, CA (US); Jessica Nicola Staddon, Redwood City, CA (US); Brent Waters, Palo Alto, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 1078 days.

(21) Appl. No.: 11/008,003

(22) Filed: Dec. 9, 2004

(65) Prior Publication Data

US 2006/0129545 A1 Jun. 15, 2006

(51) Int. Cl.
*G06F 17/30* (2006.01)
*H04L 9/12* (2006.01)
*H04L 9/14* (2006.01)

(52) U.S. Cl. .............. 713/193; 713/165; 713/189; 707/759

(58) Field of Classification Search .......... 713/193, 713/165, 189
See application file for complete search history.

(56) References Cited

U.S. PATENT DOCUMENTS

| | | | |
|---|---|---|---|
| 5,442,699 A * | 8/1995 | Arnold et al. ............ | 713/188 |
| 7,318,161 B2 * | 1/2008 | Aoki et al. ............... | 713/193 |
| 2002/0174355 A1* | 11/2002 | Rajasekaran et al. ...... | 713/193 |
| 2004/0243816 A1* | 12/2004 | Hacigumus et al. ....... | 713/193 |
| 2005/0147246 A1* | 7/2005 | Agrawal et al. .......... | 380/44 |
| 2006/0041533 A1* | 2/2006 | Koyfman ................. | 707/3 |

OTHER PUBLICATIONS

Dawn Song, Practical Techniques For Searches On Encrypted Data, 2000, California Univ., Berkeley CA.*
Zheng-Fei Wang, Fast Query Over Encrypted Character Data in Database, 2004, Springer-Verlag Berlin Heidelberg.*
Golle et al. "Secure conjunctive keyword search over encrypted data"; ACNS, pp. 31-45, 2004.*
Song et al., "Practical Techniques For Searches On Encrypted Data," Proc. of IEEE Security and Priv. Symp. (2000).

* cited by examiner

*Primary Examiner*—Jung Kim
*Assistant Examiner*—Izunna Okeke
(74) *Attorney, Agent, or Firm*—Patrick J. S. Inouye; Scott E. Smith

(57) ABSTRACT

A system and method for providing a conjunctive keyword search over encrypted data is presented. A plurality of encrypted data is maintained. Each encrypted data includes a plurality of keyword fields that each contain a keyword. The keywords for the keyword fields are encrypted for each encrypted data. A capability is generated for two or more such encrypted keywords that includes a plurality of parameters defining a conjunctive keyword search. The capability is sent from a requestor to a server. The capability is applied to the encrypted keywords with the server to generate a result and the result is provided to the requestor.

34 Claims, 14 Drawing Sheets

SYSTEM AND METHOD FOR PERFORMING A CONJUNCTIVE KEYWORD SEARCH OVER ENCRYPTED DATA

The U.S. Government has a paid-up license in this invention and the right In limited circumstances to require the patent owner to license others on reasonable terms as provided by the terms of Contract No. F30602-03-C-0037 awarded by DARPA.

FIELD

This application relates in general to information searching and, in particular, to a system and method for performing a conjunctive keyword search over encrypted data.

BACKGROUND

Conventional data storage and retrieval methodologies maintain data, such as documents or email, in a repository for efficient storage and shared retrieval. Keyword fields can be defined over the data to facilitate searches through queries that specify target keywords for one or more keyword fields. The keyword fields identify specific documents through headers or other metadata associated with the data.

Generally, these methodologies assume that adequate bandwidth and processing are available between the repository and user systems seeking to search for data matching queried keywords. Recently, advances in mobile technologies and wireless networks have greatly enhanced accessibility to remotely maintained data repositories. However, mobile devices often tradeoff portability for processing and storage capabilities, while wireless networks sacrifice bandwidth for increased availability. As a result, users increasingly resort to storing their data on a server that provides a central data repository readily accessible by mobile devices and via wireless networks.

Storing sensitive data on a server providing a remotely-accessible central data repository requires a level of trust in the server relative to the stored data. Alternatively, to ensure confidentiality against an untrusted server, a user can encrypt the data, which will also protect against data compromise while the data is in transport. Encryption ensures that the server or other non-authorized users derive no knowledge from the contents of the stored data. In particular, encryption makes selective data retrieval by the server impossible, since the server cannot determine or select specific data based on search criteria. Yet the ability to retrieve data selectively is important to preserve the bandwidth resources of the user.

One approach to enable a server to identify specific data containing a certain keyword is provided through capabilities, such as described in Song et al., "Practical Techniques for Searches on Encrypted Data," Proc. of IEEE Security and Priv. Symp. (2000), the disclosure of which is incorporated by reference. Each capability reveals only the data that contains a given keyword in a given keyword field and discloses no other information. The data and keywords are encrypted by the user in a way that later lets the user generate capabilities that enable the server to identify data matching a given keyword in a given keyword field without compromising the confidentiality of either the data or keyword. A capability reveals only the keyword field that it applies to, and the data that matches the queried keyword in that field. The server learns no information from the encrypted data without the capability.

In existing work, each capability is limited to only allowing the server to identify a subset of the data that matches a specific keyword in a specific keyword field. Conversely, capabilities do not generally allow a server to directly search data through Boolean combinations, such as conjunctive searches. Individual single-keyword capabilities can be combined by the server to intersect individual subsets of search results and derive conjunctive search results. This methodology, however, allows the server to indirectly associate specific encrypted data with each keyword and further information could eventually be derived by combining knowledge of statistically likely searches. This approach is unsatisfactory because the privacy of the data is compromised to some extent. Alternatively, a user can store additional information on the server in the form of meta-keywords to facilitate conjunctive searches. A meta-keyword is defined for every possible conjunction of keywords and is associated with the encrypted data across the various keyword fields. This methodology, however, requires an exponential amount of data storage for the $2^m$ meta-keywords generated for each document that contains m keyword fields. This second approach is not satisfactory due to the excessive storage costs incurred on the server.

Therefore, there is a need for an approach to conjunctive searches of encrypted data using communication and storage efficient queries that increase data privacy against an untrusted server.

SUMMARY

One embodiment provides a method for providing a conjunctive keyword search over encrypted data. A plurality of encrypted data is maintained. Each encrypted data includes a plurality of keyword fields that each contain a keyword. The keywords for the keyword fields are encrypted for each encrypted data. A capability is generated for two or more such encrypted keywords that includes a plurality of parameters defining a conjunctive keyword search. The capability is sent from a requester to a server. The capability is applied to the encrypted keywords with the server to generate a result and the result is provided to the requester.

A further embodiment provides a system and method for requesting a conjunctive keyword search over encrypted data. Keywords for keyword fields for each of a plurality of encrypted data are encrypted. Each encrypted data includes a plurality of the keyword fields that each contain one such keyword. A capability is generated for two or more such encrypted keywords that includes a plurality of parameters defining a conjunctive keyword search. The capability is sent to be applied to the encrypted keywords to generate a result. The result is received in response to the sent capability.

A further embodiment provides a system and method for performing a conjunctive keyword search over encrypted data. A capability is received and includes a plurality of parameters defining a conjunctive keyword search for two or more encrypted keywords. Each such encrypted keyword is encrypted for keyword fields for each of a plurality of encrypted data. Each encrypted data includes a plurality of the keyword fields that each contain a keyword. The capability is applied to the encrypted keywords to generate a result. The result is sent in response to the received capability.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Conjunctive Keyword Search Environment

Figure 1:
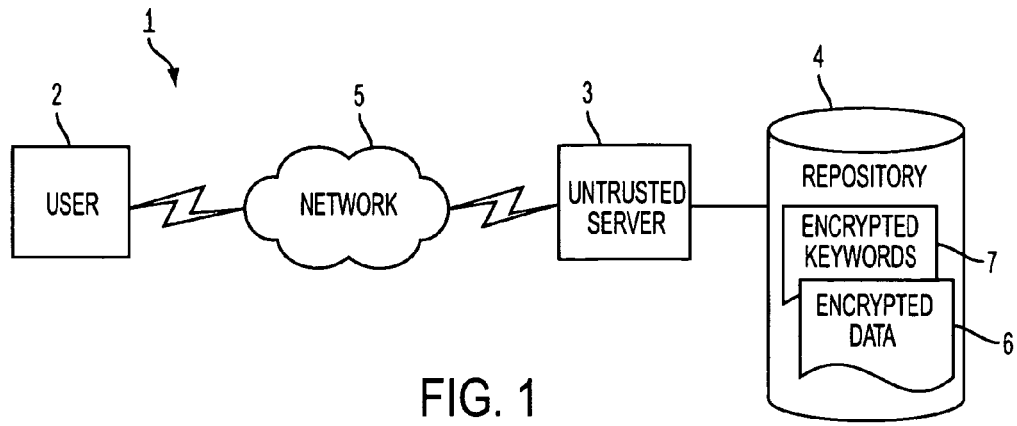
FIG. 1 is a block diagram showing, by way of example, a user system and an untrusted server upon which a conjunctive keyword search over encrypted data is provided.

FIG. 1 is a block diagram 1 showing, by way of example, a user system 2 and an untrusted server 3 upon which a conjunctive keyword search over encrypted data is provided. The user system 2 remotely accesses the untrusted server 3 over a network 5, such as the Internet, as a requester. In one embodiment, the untrusted server 3 is coupled to a repository 4, in which encrypted data 6 and encrypted keywords 7 can be stored. In a further embodiment, the encrypted data 6 and encrypted keywords 7 can be stored in separate repositories and each such repository can be coupled to the same or different untrusted servers. In a still further embodiment, the encrypted data 6 and encrypted keywords 7 can be distributed over several separate repositories and conjunctive searches operate on the logical union of the individual subsets of encrypted data 6 and encrypted keywords 7. Conjunctive keyword searches of two or more keywords, identified through capabilities, can be executed by the user system 2 against the untrusted server 3, as further described below beginning with reference to FIG. 3 et seq. The untrusted server 3 applies the capabilities to the encrypted keywords 7 and provides a result to the user system 2, which can include an encrypted data 6 or Boolean indication of whether such a result exists.

Figure 2:
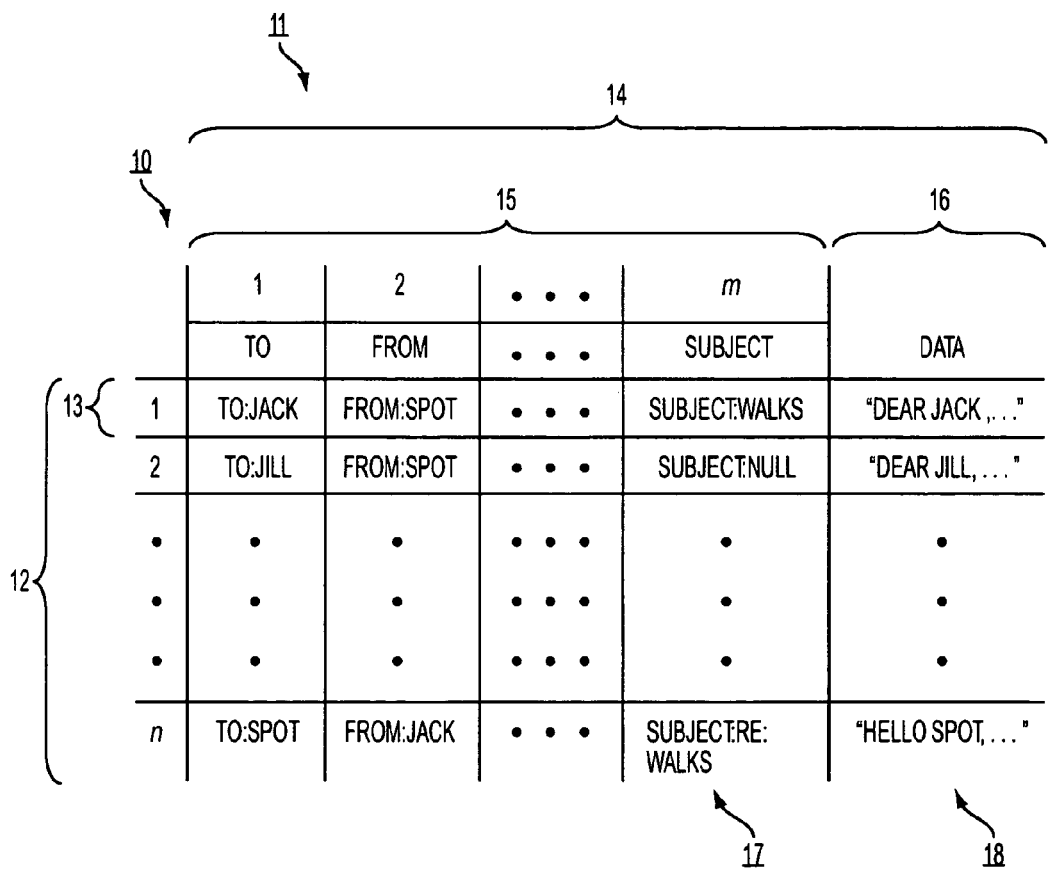
FIG. 2 is a data structure diagram showing, by way of example, a table storing data and associated keywords in keyword fields.

In one embodiment, the encrypted data 6 contain documents or email encrypted with a standard symmetric key cipher next to a vector of corresponding encrypted keywords 7. FIG. 2 is a data structure diagram 10 showing, by way of example, a table 11 storing data 18 and associated keywords 17 in keyword fields 15. For clarity, the data 18 and keywords 17 are shown in decrypted form, although both the data 18 and keywords 17 would be encrypted when stored in the repository 4. The sets of columns 14 include the keyword fields 15 and a data field 16. The sets of rows 12 include one row 13 per data 18.

Referring back to FIG. 1, for clarity, the remaining discussion focuses on the encrypted keywords 7 and assumes that the encrypted data 6 received from the user system 2 is properly stored and that the encrypted data 6 associated with a particular query can be identified and provided to the user system 2.

Preferably, the user system 2 and untrusted server 3 are general-purpose computers executing operating system and providing an application execution environment. The user system 2 and untrusted server 3 include components conventionally found in a personal computer or server, such as, for example, a central processing unit, display, keyboard, mouse, and various components for interconnecting these components. Program code, including software programs and data is loaded into memory for execution and processing by the central processing unit and results are generated for display, output, transmittal, or storage.

Overview

Conjunctive keyword searches are applied as a Boolean AND operation across keyword fields. Referring again to FIG. 2, an example of a conjunctive keyword search for all data 18 containing the keywords "To:Jill" 17 and "Subject: NULL" 17 would require searching the "To" and "Subject" keyword fields 15 and return all data 18 for which the "To" keyword field 15 contains the keyword "To:Jill" AND the "Subject" keyword field 15 contains the keyword "Subject: NULL."

Two schemes for providing a conjunctive keyword search over encrypted data are described. In the first scheme, each capability is accompanied by a seed-capability. The security of the protocol relies on the Decisional Diffie-Hellman (DDH) assumption. The communication cost for sending each seed capability from the user system 2 to the untrusted server 3 is linear in the number of encrypted data 6 stored. A constant communication cost is incurred for each capability. In the second scheme, a capability is generated alone and incurs a constant communication cost when sent from the user system 2 to the untrusted server 3. The second protocol relies on a new hardness assumption for security.

For both schemes, the capabilities disclose the keyword fields 15 that are being searched to the untrusted server 3, but the values of those fields, that, is, the actual keywords 17, are not revealed. In addition, the following assumptions apply.

First, let n be the total number of encrypted data 18 stored in repository 4 with m keyword fields 15 each. For purposes of discussion, the same keyword 17 can be assumed, without loss of generality, to never appear in two different keyword fields 15 and every keyword field 15 is defined for every data 18. By way of example, each keyword 17 can be prepended with the name of the keyword field 15 to which the keyword 17 belongs. For instance, the keyword "To:Jack" 17 belongs to the "To" field 15 and is readily distinguishable from the keyword "From:Spot" 17 belonging to the "From" field 15 and the keyword "Subject:Walks" 17 belonging to the "Subject" field 15. Similarly, the term "NULL" can be used to define empty keywords 17. For instance, the keyword "Subject:NULL" 17 is used for each data 18 having empty "Subject" keyword fields 15.

Next, each data 18 is identified with a keyword vector $\vec{D}_i$ of m keywords that characterizes the data. For i=1, ..., n, the ith document is denoted by $D_i = (W_{i,1}, \ldots, W_{i,m})$, where $W_{i,j}$ is the keyword of document $D_i$ in the jth keyword field. For instance, the data "Dear Jill, ..." 18 appearing in row 2 has a keyword vector $\vec{D}_2 = ($"To:Jill", "From:Spot", ... "Subject:NULL"$)$. A specific keyword in field j is denoted by $W_j$, where the capability Cap enables the untrusted server 3 to verify that a data 18 contains the keyword $W_j$. For example, the capability Cap allows the untrusted server 3 to search for the keyword $W_j$="From:Spot" in the keyword field indexed by j=2.

Conjunctive Search with Linear Online Communications Cost

The first scheme uses a capability together with a seed capability that was previously made accessible to the untrusted server to perform a conjunctive keyword query on encrypted data. Each seed capability consists of an amount of data that is linear in n, the total number of encrypted documents stored on the server. This data is independent of the conjunctive query expressed in the capability. Each capability consists of a constant amount of data that depends on the conjunctive query that the capability allows. Queries do not depend upon the number of documents stored on the untrusted server 3, but instead only depend upon the number m of keyword fields per document.

To perform a conjunctive keyword search, a user system sends a seed capability and capability as a query to an untrusted server, which applies the seed capability and capability to the encrypted keywords to identify an encrypted data matching the query. The untrusted server can then return that encrypted data to the user system or can merely indicate that such an encrypted data does or does not exist. If appropriate, the user system can decrypt the encrypted data for subsequent display on a monitor, storage on a storage device or other similar operation.

User System for Providing a Conjunctive Keyword Search

Figure 3:
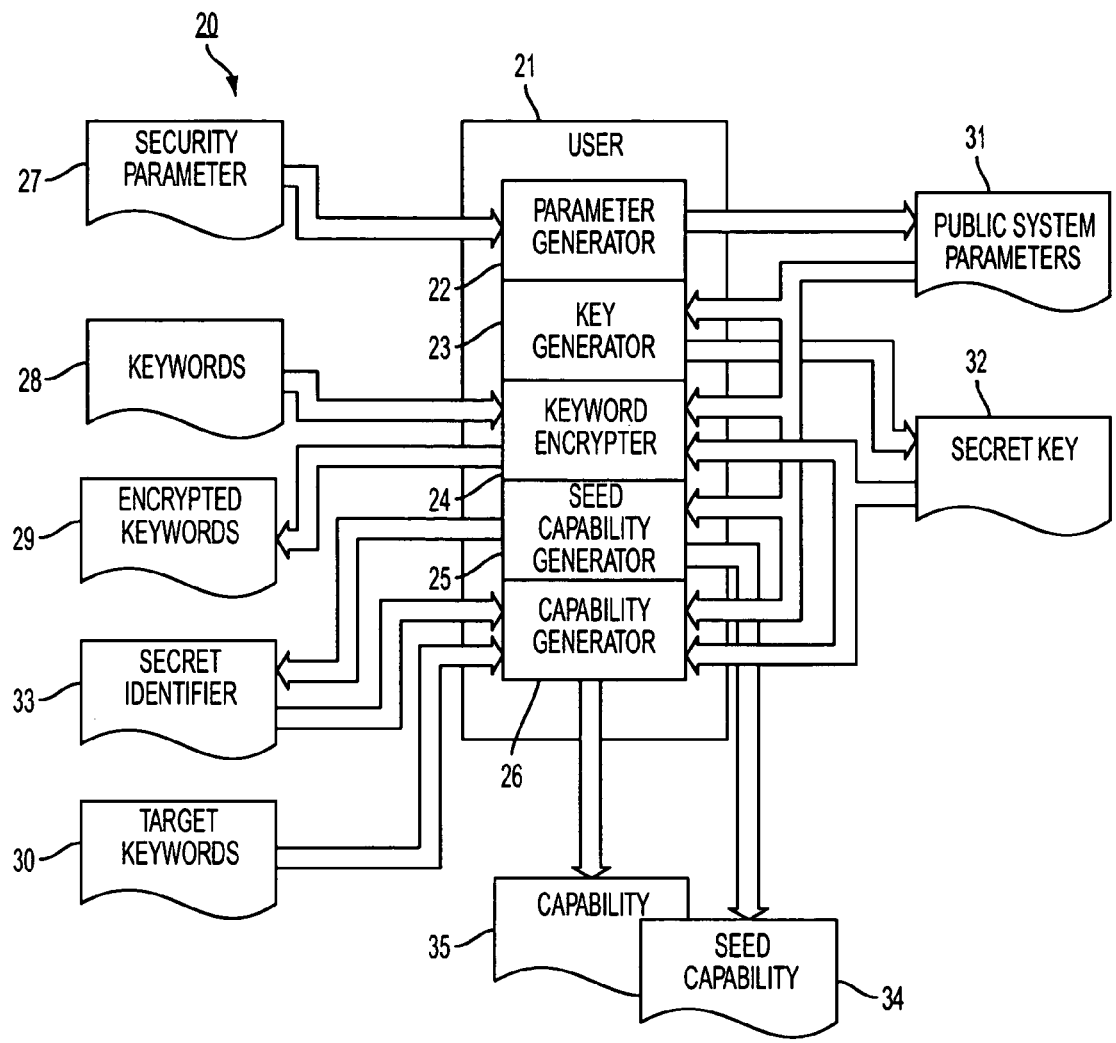
FIG. 3 is a block diagram showing a user system for providing a conjunctive keyword search over encrypted data, in accordance with one embodiment.

FIG. 3 is a block diagram 20 showing a user system 21 for providing a conjunctive keyword search over encrypted data, in accordance with one embodiment. The user system 21 includes a parameter generator 22, key generator 23, keyword encrypter 24, seed capability generator 25, and capability generator 26. The user system 21 first selects a security parameter k 27 that is used throughout the scheme, from which the parameter generator 22 generates public system parameters ρ 31 that are used by the key generator 23, keyword encrypter 24, and capability generator 26, as further described below with reference to FIG. 6. The key generator 23 generates a secret key K 32, that is used by the keyword encrypter 24 and capability generator 26, as further described below with reference to FIG. 7. The keyword encrypter 24 encrypts the keywords $\vec{D}_i$ 28 to form the set of encrypted keywords 29 that are provided to the untrusted server 3 (shown in FIG. 1), as further described below with reference to FIG. 8. The seed capability generator 25 takes the public system parameters ρ 31 as inputs and outputs a seed capability 34 and a secret identifier 33. Finally, the capability generator 26 receives the secret identifier 33 and a set of target keywords 30 in specified keyword fields 15 (shown in FIG. 2) and generates capabilities C 35 that are also provided to the untrusted server 3, as further described below with reference to FIG. 9.

In one embodiment, the seed capabilities Q 34 and capabilities C 35 are generated and provided to the untrusted server 3 as a combined set of operations. In a further embodiment, the seed capabilities Q 34 and capabilities C 35 can be generated and provided to the untrusted server 3 as a separate sets of operations performed, for instance, by an additional user system (not shown), such as a personal computer and a mobile device. The personal computer would generate and provide the seed capabilities Q 34 over a high bandwidth network connection, while the mobile device would generate and provide the capabilities C 35 over a lower bandwidth network connection, such as a wireless network connection. Other configuration and network topologies are possible.

Untrusted Server for Providing a Conjunctive Keyword Search

Figure 4:
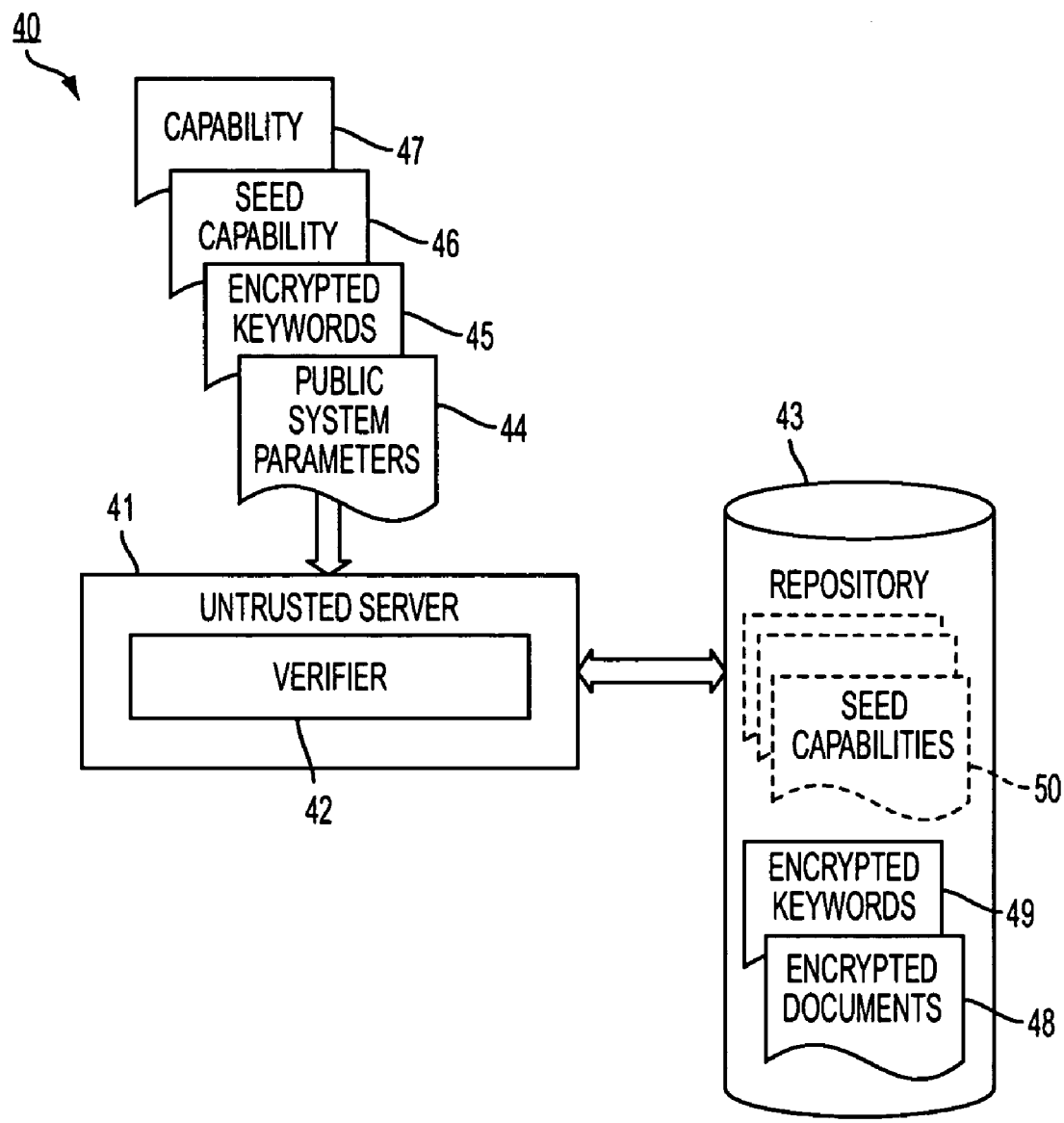
FIG. 4 is a block diagram showing an untrusted server for providing a conjunctive keyword search over encrypted data, in accordance with one embodiment.

FIG. 4 is a block diagram 40 showing an untrusted server 41 for providing a conjunctive keyword search over encrypted data, in accordance with one embodiment. The untrusted server 41 maintains a repository 43 in which encrypted data 48 and encrypted keywords 49 are stored. The untrusted server 41 receives the public system parameters ρ 44, encrypted keywords 45, seed capability Q 46, and capability C 47 from the user system 21 (shown in FIG. 3), which are used by a verifier 42 to identify one or more of the encrypted data 48 conjunctively matching two or more encrypted keywords 49 provided in the capability 47, as further described below with reference to FIG. 10. In a further embodiment, seed capabilities 50 are stored in the repository 43 through a separate set of operations performed by the user system 21.

Conjunctive Keyword Search Method

Figure 5:
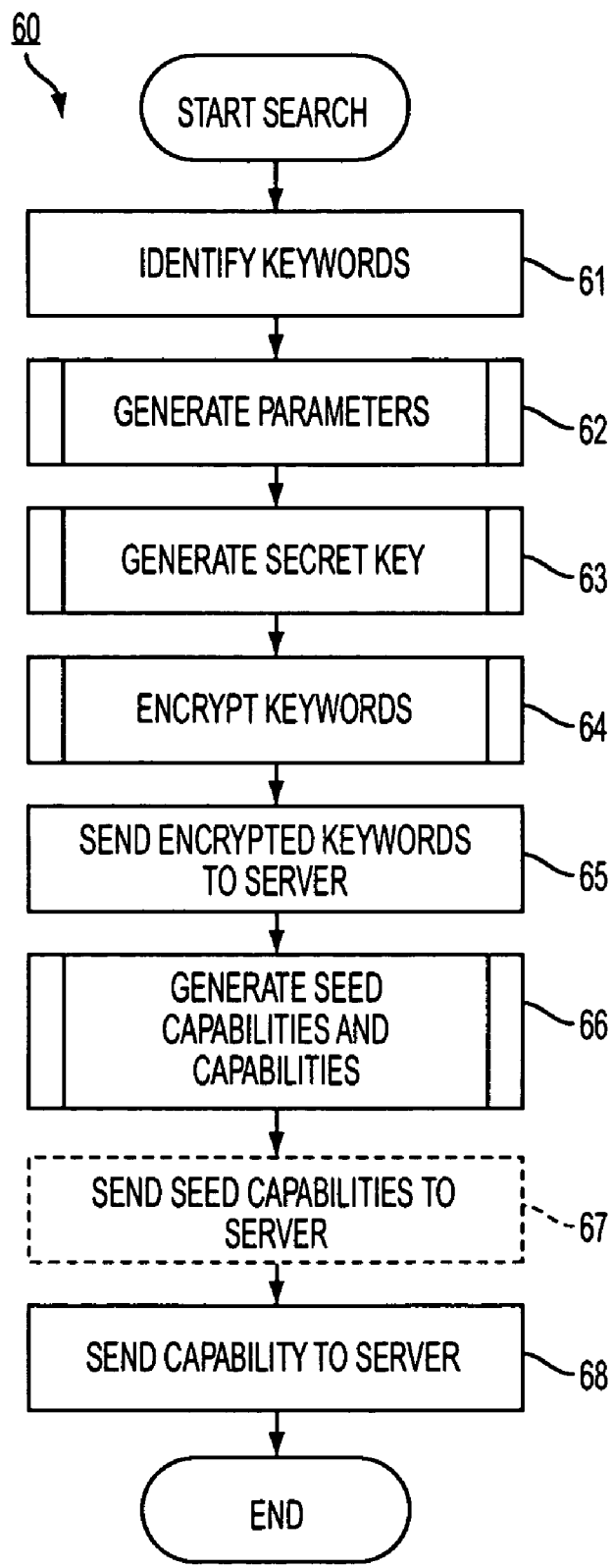
FIG. 5 is a flow diagram showing a method for providing a conjunctive keyword search over encrypted data, in accordance with one embodiment.

FIG. 5 is a flow diagram 60 showing a method for providing a conjunctive keyword search over encrypted data, in accordance with one embodiment. The method is described as a sequence of process operations or steps, which can be executed, for instance, by a user system 21.

Initially, for each document i, a set of m keywords $\vec{D}_i = (W_{i,1}, \ldots, W_{i,m})$ is identified (block 61). Next, a set of public parameters, $\rho = (G, g, f(\cdot,\cdot), h(\cdot))$, are generated (block 62), as further described below with reference to FIG. 6. A secret key K 32 is generated (block 63), as further described below with reference to FIG. 7. The keywords $\vec{D}_i = (W_{i,1}, \ldots, W_{i,m})$ are encrypted (block 64), as further described below with reference to FIG. 8. The encrypted keywords are sent to the untrusted server 41 (block 65) and seed capabilities 34, $Q = (h(g^{a_1 s}), h(g^{a_2 s}), \ldots, h(g^{a_n s}))$, and capabilities 35, $C = s + (\Sigma_{w=1}^{t} f_K(W_{j_w}))$, are generated (block 66), as further described below with reference to FIG. 9. In a further embodiment, the seed capabilities 34 are sent to the untrusted server 41 (block 67) as a set of operations separately from sending of the capability 35 to the untrusted server 41 (block 68). Upon receiving the seed capabilities 34 and capabilities 35, the untrusted server 41 applies the seed capabilities 34 and capabilities 35 to the encrypted keywords 49 to perform a conjunctive keyword query, as further described below with reference to FIG. 10.

Parameter Generation Function

Figure 6:
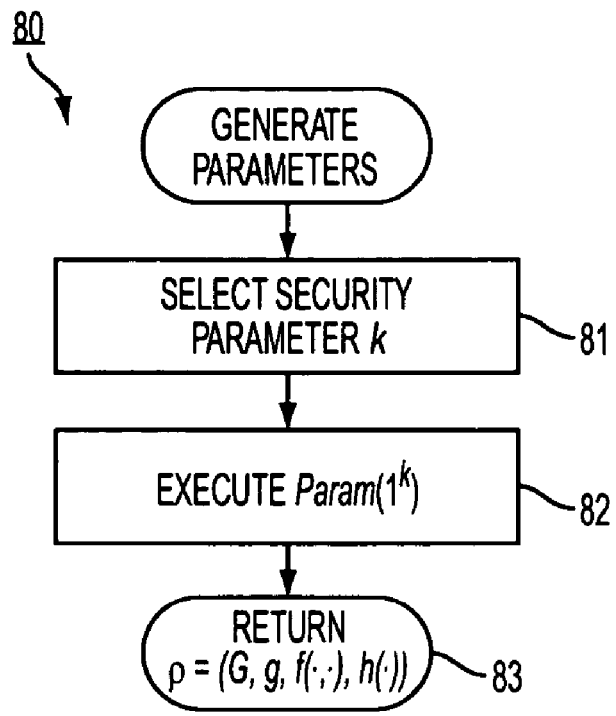
FIG. 6 is a flow diagram showing a function for generating parameters for use in the method of FIG. 5.

FIG. 6 is a flow diagram 80 showing a function for generating parameters for use in the method of FIG. 5.

A security parameter k is first selected (block 81) and a parameter generation function Param($1^k$) is executed (block 82). The parameter generation function Param($1^k$) returns parameters $\rho=(G, g, f(\cdot,\cdot), h(\cdot))$ (block 83), where G is a group of order q in which DDH is hard, g is a generator of G, $f:\{0,1\}^k\times\{0,1\}^*\rightarrow Z^*_q$ is a keyed function and h is a hash function, which is used as a random oracle. The security parameter k is used implicitly in the choice of the group G and the functions $f$ and h.

Secret Key Generation Function

Figure 7:
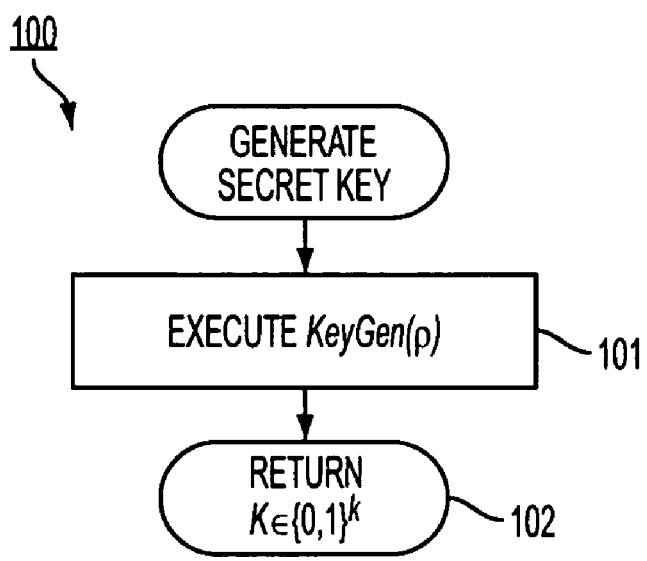
FIG. 7 is a flow diagram showing a function for generating a secret key for use in the method of FIG. 5.

FIG. 7 is a flow diagram 100 showing a function for generating a secret key 32 for use in the method of FIG. 5.

A key generation function KeyGen($\rho$) is executed (block 101). The key generation function KeyGen($\rho$) returns a secret key $K\in\{0,1\}^k$ 32 for the function $f$ (block 102), which is denoted by $f(K,\cdot)$ by $f_K(\cdot)$. The family $\{f_K(\cdot)\}_K$ is a pseudorandom function family.

Keyword Encryption Function

Figure 8:
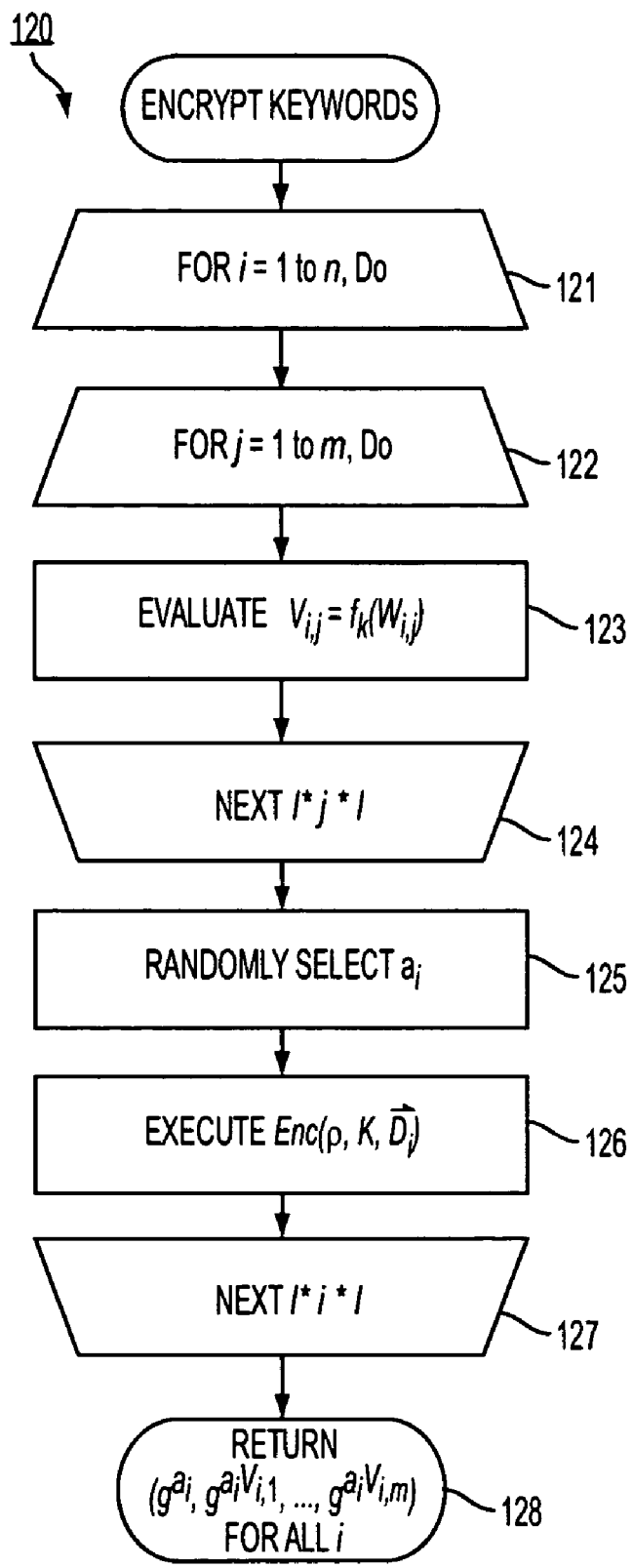
FIG. 8 is a flow diagram showing a function for encrypting keywords for use in the method of FIG. 5.

FIG. 8 is a flow diagram 120 showing a function for encrypting keywords for use in the method of FIG. 5.

The keywords $W_{i,j}$ are processed in a pair of iterative processing loops (blocks 121-127 and 122-124) as follows. For each data $D_i$ (block 121) and for each keyword $W_{i,j}$ (block 122), each keyword $W_{i,j}$ is evaluated against the keyed function $f_K(\cdot)$. The keyed function returns $V_{i,j}=f_K(W_{i,j})$ (block 123) for each remaining keyword (block 124). A value $a_i$ is chosen uniformly at random from $Z^*_q$ (block 125) and an encryption function Enc($\rho$, K, $D_i$) is evaluated to determine a vector $(g^{a_i}, g^{a_iV_{i,1}}, g^{a_iV_{i,2}}, \ldots, g^{a_iV_{i,m}})$ (block 126), where $D_i=(W_{i,1}, \ldots, W_{i,m})$. Processing continues for each remaining document (block 127). Encryption function Enc($\rho$, K, $D_i$) returns the vector $(g^{a_i}, g^{a_iV_{i,1}}, g^{a_iV_{i,2}}, \ldots, g^{a_iV_{i,m}})$ for all i (block 128).

Seed Capability and Capability Generation Function

Figure 9:
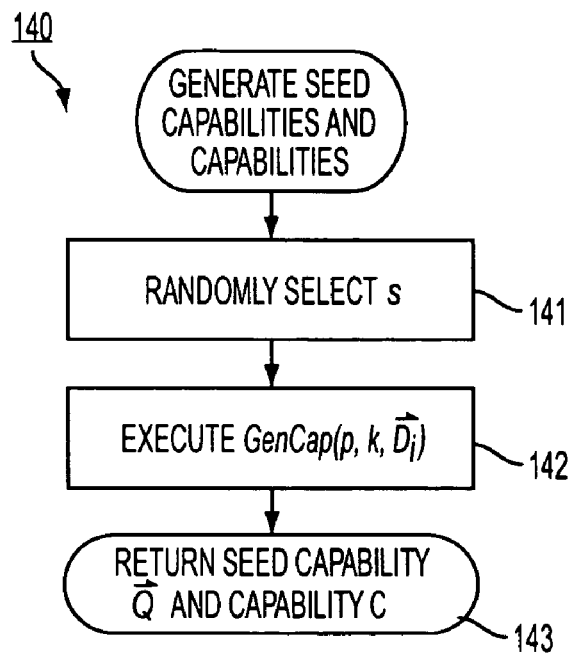
FIG. 9 is a flow diagram showing a function for generating seed capabilities and capabilities for use in the method of FIG. 5.

FIG. 9 is a flow diagram 140 showing a function for generating seed capabilities and capabilities for use in the method of FIG. 5.

A value s is chosen uniformly at random from $Z^*_q$ (block 141). A capability generation function GenCap($\rho$, K, $j_1, \ldots, j_t, W_{j_1}, \ldots, W_{j_t}$) is evaluated (block 142), which implicitly requires looping over all documents to build the vector Q. The capability generation function GenCap($\rho$, K, $j_1, \ldots, j_t, W_{j_1}, \ldots, W_{j_t}$) generates a capability that consists of a vector Q of size linear in the number of documents n and of a capability of constant size. The seed capability vector Q is defined as: $Q=(h(g^{a_1s}), h(g^{a_2s}), \ldots h(g^{a_ns}))$. The capability is defined as $C=s+(\sum_{w=1}^{t} f_K(W_{j_w}))$. The capability is the (t+2)—tuple, Cap=$\{Q, C, j_1, \ldots, j_t\}$. Function returns the seed capability Q and capability C (block 143).

Conjunctive Keyword Search Application Method

Figure 10:
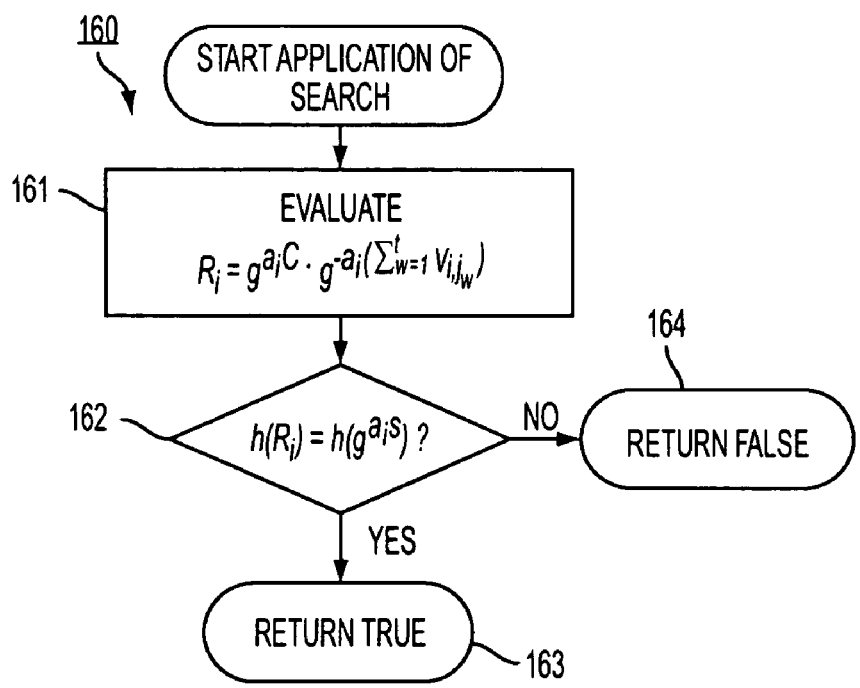
FIG. 10 is a flow diagram showing a method for applying a conjunctive keyword search.

FIG. 10 is a flow diagram 160 showing a method for applying a conjunctive keyword search. The method is described as a sequence of process operations or steps, which can be executed, for instance, by an untrusted server 41.

The untrusted server 41 evaluates $$R_i = g^{a_iC} \cdot g^{-a_i(\sum_{w=1}^{t} V_{i,jw})}$$

(block 161) and returns true (block 163) if $h(R_i)=h(g^{a_is})$ (block 162) and false otherwise (block 164).

Conjunctive Search with Constant Online Communications Cost

In the second scheme, there are no seed-capabilities and the total communication cost of sending a capability to the untrusted server 3 is constant in the number of documents n, but linear in the number of keyword fields m.

To perform a conjunctive keyword search, a user system sends a capability as a query to an untrusted server, which applies the capability to the encrypted keywords to identify an encrypted data matching the query. The untrusted server can then return that encrypted data to the user system or can merely indicate that such an encrypted data does or does not exist. If appropriate, the user system can decrypt the encrypted data for subsequent display on a monitor, storage on a storage device or other similar operation.

User System for Providing a Conjunctive Keyword Search

Figure 11:
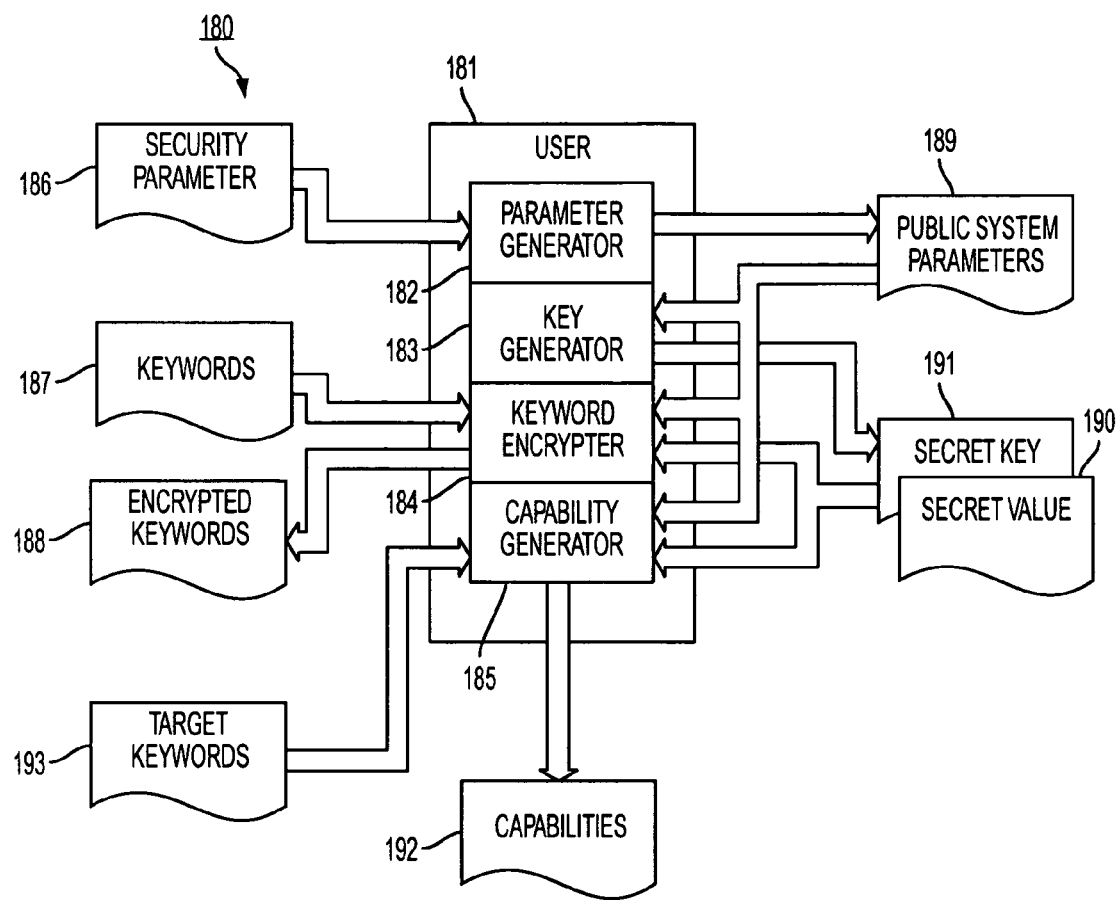
FIG. 11 is a block diagram showing a user system for providing a conjunctive keyword search over encrypted data, in accordance with a further embodiment.

FIG. 11 is a block diagram 180 showing a user system 181 for providing a conjunctive keyword search over encrypted data, in accordance with a further embodiment. Similar to the user system 21 (shown in FIG. 3), the user system 181 includes a parameter generator 182, key generator 183, keyword encrypter 184, and capability generator 185. The user system 181 first selects a security parameter k 186 that is used throughout the scheme, from which the parameter generator 182 generates public system parameters $\rho$ 189 that are used by the key generator 183, keyword encrypter 184, and capability generator 185, as further described below with reference to FIG. 14. The key generator 183 generates a secret value a 190 and key K 191, that is used by the keyword encrypter 184 and capability generator 185, as further described below with reference to FIG. 15. The keyword encrypter 184 encrypts the keywords $\vec{D}_i$ 187 to form the set of encrypted keywords 188 that are provided to the untrusted server 3 (shown in FIG. 1), as further described below with reference to FIG. 16. Finally, the capability generator 185 receives a set of target keywords 193 in specified keyword fields 15 (shown in FIG. 2) and generates capabilities Cap 192 that are also provided to the untrusted server 3, as further described below with reference to FIG. 17.

Untrusted Server for Providing a Conjunctive Keyword Search

Figure 12:
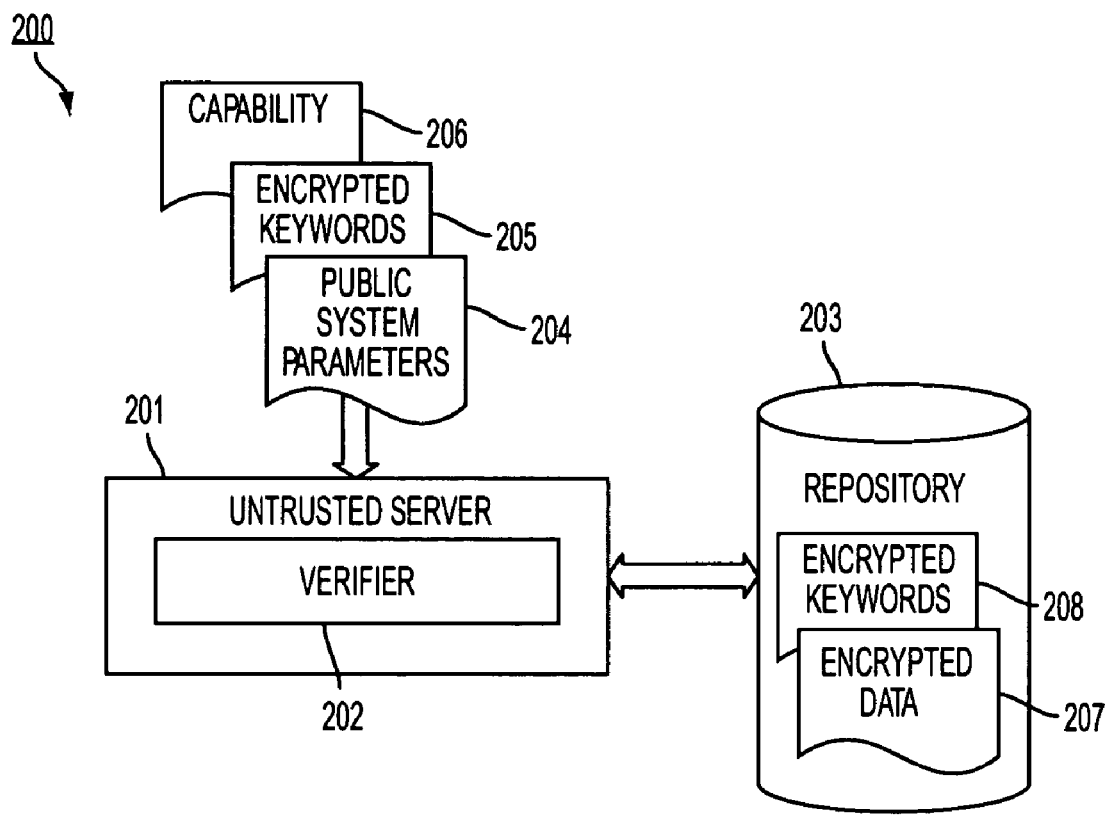
FIG. 12 is a block diagram showing an untrusted server for providing a conjunctive keyword search over encrypted data, in accordance with a further embodiment.

FIG. 12 is a block diagram 200 showing an untrusted server 201 for providing a conjunctive keyword search over encrypted data, in accordance with a further embodiment. Similar to the untrusted server 21 (shown in FIG. 4), the untrusted server 201 maintains a repository 203 in which encrypted data 207 and encrypted keywords 208 are stored. The untrusted server 201 receives the public system parameters $\rho$ 204, encrypted keywords 205, and capability Cap 206 from the user system 181 (shown in FIG. 11), which are used by a verifier 202 to identify one or more of the encrypted data 207 conjunctively matching two or more encrypted keywords 208 provided in the capability 206, as further described below with reference to FIG. 18.

Conjunctive Keyword Search Method

Figure 13:
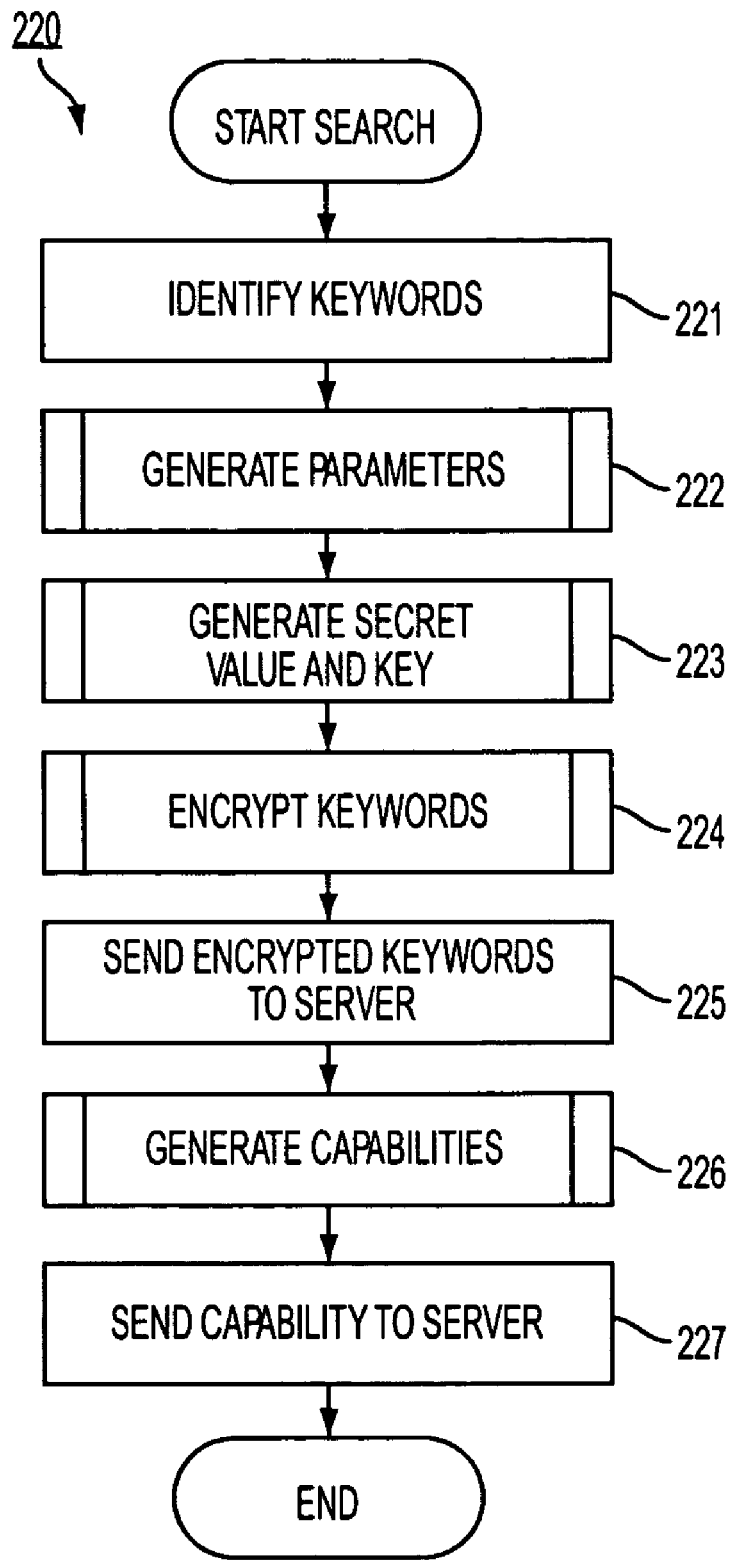
FIG. 13 is a flow diagram showing a method for providing a conjunctive keyword search over encrypted data, in accordance with a further embodiment.

FIG. 13 is a flow diagram showing a method 220 for providing a conjunctive keyword search over encrypted data, in accordance with a further embodiment. The method is described as a sequence of process operations or steps, which can be executed, for instance, by a user system 181.

Initially, for each document i, a set of m keywords $\vec{D}_i=(W_{i,1}, \ldots, W_{i,m})$ is identified (block 221). Next, a set of public parameters $\rho=(G_1, G_2, \hat{e}, g, f(\cdot,\cdot))$ are generated (block 222), as further described below with reference to FIG. 14. A secret value a and key K are generated (block 223), as further described below with reference to FIG. 15. The keywords $\vec{D}_i=(W_{i,1}, \ldots, W_{i,m})$ are encrypted (block 224), as further below with reference to FIG. 16. The encrypted keywords are sent to the untrusted server 201 (block 225) and capabilities 192, $$\left(g^{ar}, g^{ar(\sum_{w=1}^{t} f_K(W_{j_w}))}, g^r, j_1, \ldots, j_t\right)$$

are generated (block 226), as further described below with reference to FIG. 17. Finally, one or more capabilities 192 are sent to the untrusted server 201 (block 227). Upon receiving the one or more capabilities 192, the untrusted server 201 applies the capabilities 192 to the encrypted keywords 208 to perform a conjunctive keyword query, as further described below with reference to FIG. 18.

Parameter Generation Function

Figure 14:
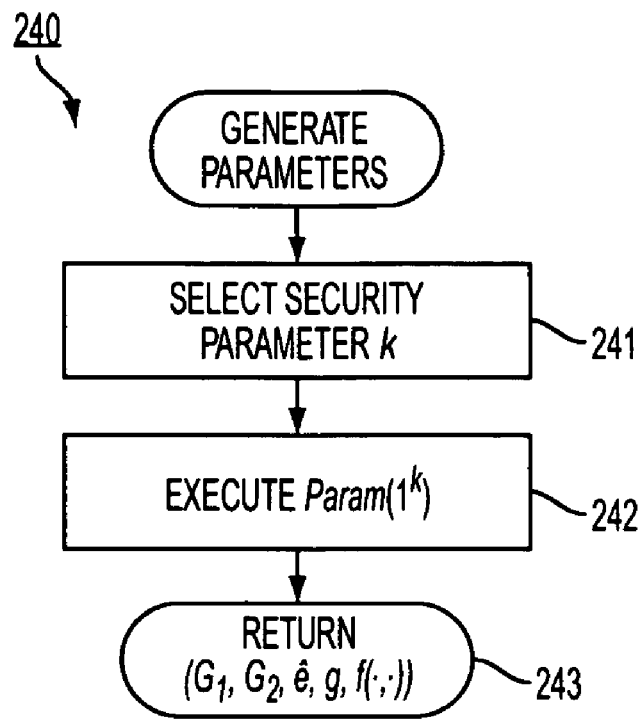
FIG. 14 is a flow diagram showing a function for generating parameters for use in the method of FIG. 13.

FIG. 14 is a flow diagram showing a function for generating parameters for use in the method of FIG. 13.

Initially, a security parameter k is selected (block 241). A parameter generation function Param($1^k$) is executed (block 242). The parameter generation function Param($1^k$) returns parameters $\rho=(G_1, G_2, \hat{e}, g, f(\cdot,\cdot))$ (block 243), where $G_1$ and $G_2$ are two groups of order q, g is a generator of G, $\hat{e}$: $G_1 \times G_1 \to G_2$ is an admissible bilinear map and $f$ is a keyed function $f:\{0,1\}^k \times \{0,1\}^* \to Z^*_q$. The security parameter k is used implicitly in the choice of the groups $G_1$ and $G_2$. The keyed function $f(K,\cdot)$ is denoted by $f_K(\cdot)$, and $\{f_K(\cdot)\}_K$ forms a pseudorandom function family.

Secret Value and Key Generation Function

Figure 15:
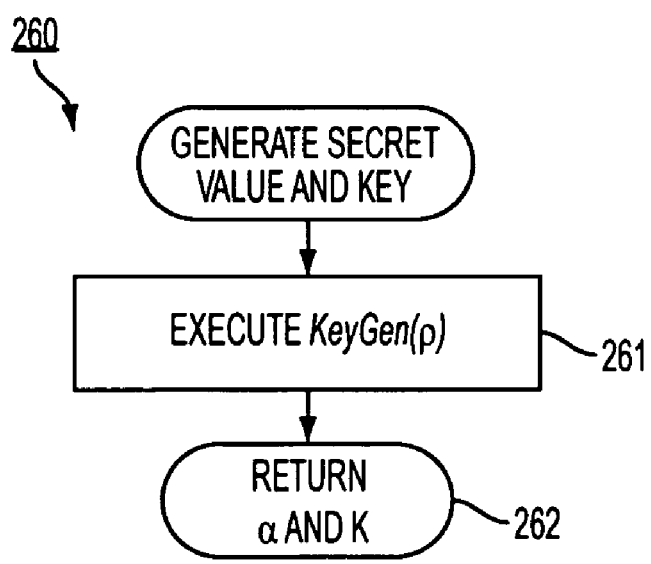
FIG. 15 is a flow diagram showing a function for generating a secret value and key for use in the method of FIG. 13.

FIG. 15 is a flow diagram showing a function for generating a secret value and key for use in the method of FIG. 13.

A key generation function KeyGen($\rho$) is executed (block 261). The key generation algorithm KeyGen($\rho$) returns a secret value a and secret key K (block 262).

Keyword Encryption Function

Figure 16:
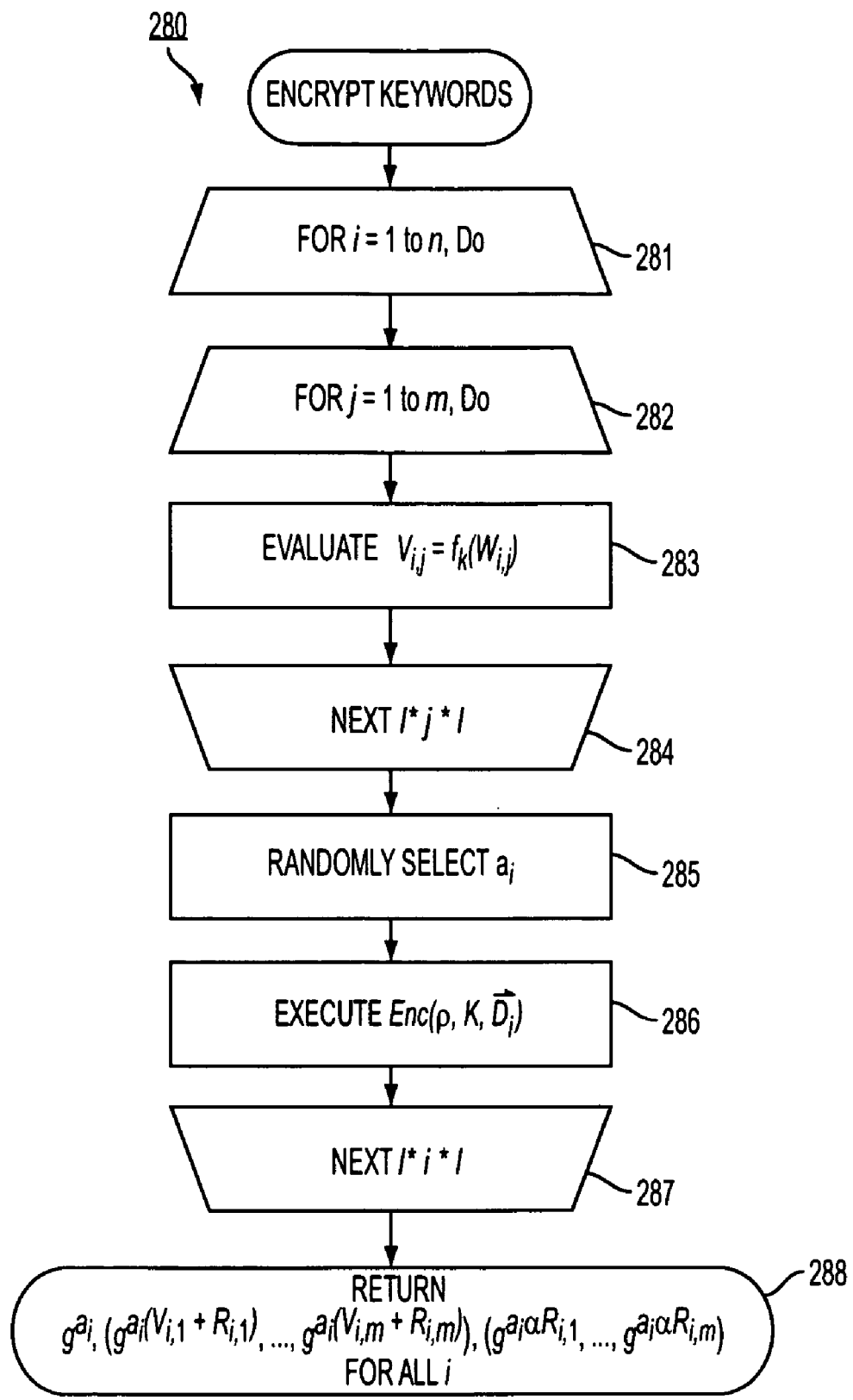
FIG. 16 is a flow diagram showing a function for encrypting keywords for use in the method of FIG. 13.

FIG. 16 is a flow diagram showing a function for encrypting keywords for use in the method of FIG. 13.

The keywords $W_{i,j}$ are processed in a pair of iterative processing loops (blocks 281-287 and 282-284) as follows. For each data $D_i$ (block 281) and for each keyword $W_{i,j}$ (block 282), each keyword $W_{i,j}$ is evaluated against the keyed function $f_K(\cdot)$. The keyed function returns $V_{i,j}=f_K(W_{i,j})$ (block 283) for each remaining keyword (block 284). A value $a_i$ is chosen uniformly at random from $Z^*_q$ (block 285) and an encryption function Enc($\rho$, K, $D_i$) is evaluated to determine the 3-tuple $g^{a_i}$, $(g^{a_i(V_{i,1}+R_{i,1})}, \ldots, g^{a_i(V_{i,m}+R_{i,m})})$, $(g^{a_i a R_{i,1}}, \ldots, g^{a_i a R_{i,m}})$ (block 286), where $D_i=(W_{i,1}, \ldots, W_{i,m})$. Processing continues for each remaining document (block 287). Encryption function Enc($\rho$, K, $D_i$) returns the 3-tuple $g^{a_i}$, $(g^{a_i(V_{i,1}+R_{i,1})}, \ldots, g^{a_i(V_{i,m}+R_{i,m})})$, $(g^{a_i a R_{i,1}}, \ldots, g^{a_i a R_{i,m}})$ for all i (block 288).

Capability Generation Function

Figure 17:
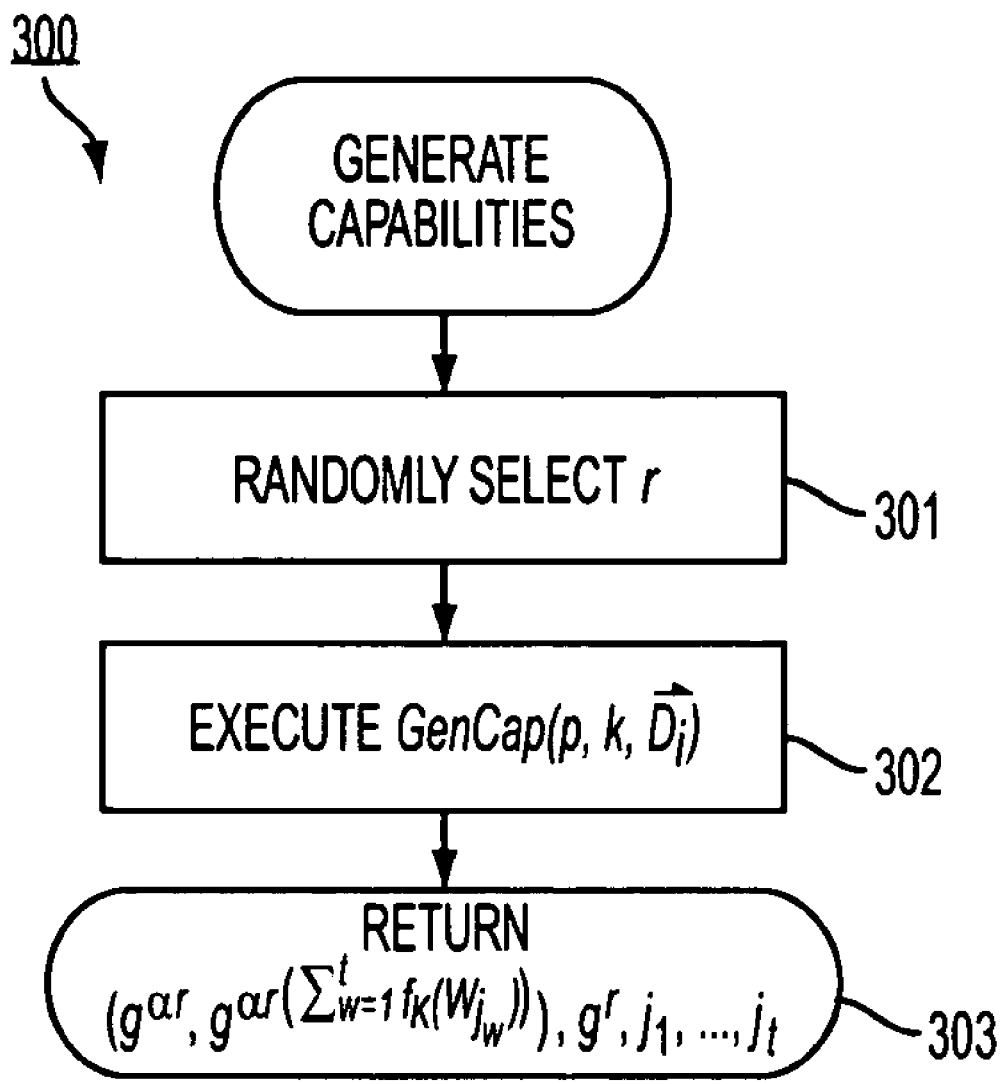
FIG. 17 is a flow diagram showing a function for generating capabilities for use in the method of FIG. 13.

FIG. 17 is a flow diagram showing a function for generating capabilities for use in the method of FIG. 13.

A value r is chosen uniformly at random from $Z^*_q$ (block 301). A capability generation function GenCap($\rho$, K, $j_1, \ldots j_t$, $W_{j_1}, \ldots, W_{j_t}$) is evaluated (block 302). The capability generation function GenCap($\rho$, K, $j_1, \ldots, j_t$, $W_{j_1}, \ldots, W_{j_t}$) generates a capability Cap. Function returns a single capability $$Cap = \left(g^{ar}, g^{ar(\sum_{w=1}^{t} f_K(W_{j_w}))}, g^r, j_1, \ldots, j_t\right) \quad \text{(block 303)}$$

Conjunctive Keyword Search Application Method

Figure 18:
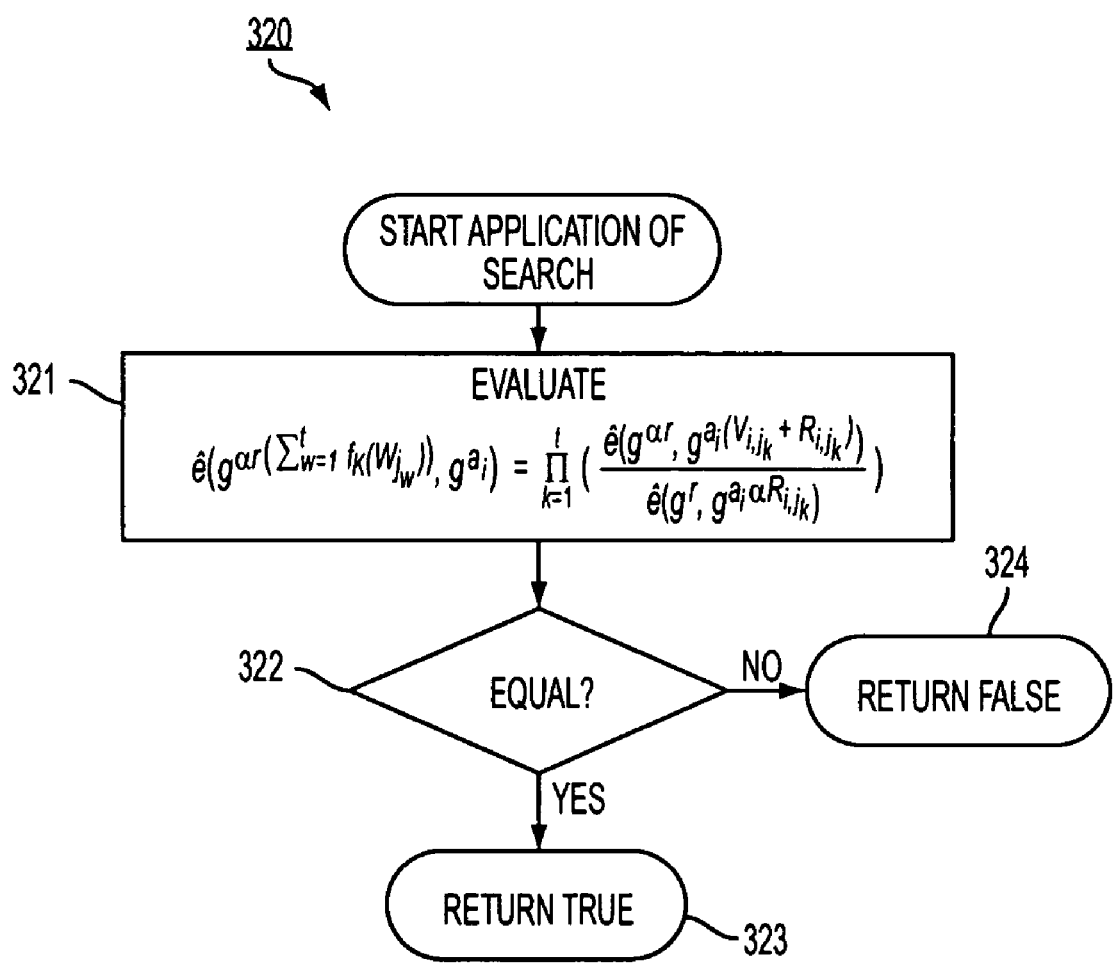
FIG. 18 is a flow diagram showing a method for applying a conjunctive keyword search.

FIG. 18 is a flow diagram showing a method for applying a conjunctive keyword search. The method is described as a sequence of process operations or steps, which can be executed, for instance, by an untrusted server 201.

The untrusted server 41 evaluates $$\hat{e}\left(g^{ar(\sum_{w=1}^{t} f_K(W_{j_w}))}, g^{a_i}\right) = \prod_{k=1}^{t} \left(\frac{\hat{e}\left(g^{ar}, g^{a_i(v_{i,j_k}+R_{i,j_k})}\right)}{\hat{e}\left(g^r, g^{a_i a R_{i,j_k}}\right)}\right) \quad \text{(block 321)}$$

and returns true (block 323) if the equality (block 322) holds, and false (block 324) otherwise.

While the invention has been particularly shown and described as referenced to the embodiments thereof, those skilled in the art will understand that the foregoing and other changes in form and detail may be made therein without departing from the spirit and scope.

What is claimed is:

1. A method for providing a conjunctive keyword search over encrypted data, comprising:
   generating on a requestor comprising an user computer, a plurality of encrypted data, each data identified with an encrypted keyword vector comprising a plurality of keyword fields that each contains a keyword associated with the encrypted data;
   maintaining on a server the encrypted data and encrypted keyword vectors generated on the requestor;
   defining on the requestor a conjunctive keyword query comprising:
      choosing a plurality of query keywords;
      encrypting the chosen keywords; and
      conjunctively combining the encrypted keywords as a plurality of parameters to comprise the conjunctive keyword query;
   generating a capability from the conjunctive keyword query and sending, the capability from the requestor to the server;
   generating at the server an encrypted result comprising:
      applying the capability exclusively to the encrypted keyword vectors and generating the encrypted result comprised of only the encrypted data identified by the keyword vectors that satisfy the capability; and
      providing to the requestor the encrypted result; and
   determining at the requestor an answer to the conjunctive keyword query solely through decryption of the encrypted result.

2. A method according to claim 1, wherein each keyword in each keyword field is unique and defined as being non-empty.

3. A method according to claim 1, further comprising:
   generating a seed capability for the plurality of encrypted keywords; and
   accessing the seed capability while applying the capability to the encrypted keywords with the server.

4. A method according to claim 3, comprising:
   generating a hash function h and a keyed function $f$ and generator g of a group G where Decisional Diffie-Hellman is hard, based on a security parameter k and generating a secret key K for the keyed function $f$ as a function of the security parameter k;
   encrypting the keywords for the keyword fields as a generator of a group G raised to a uniformly chosen random value $a_i$ and, for each such keyword, as a function of the keyed function $f$; and generating the capability C, comprising:
forming the seed capability Q comprising a vector of size linear in the number of encrypted data with each vector element comprising the hash function h evaluated on the generator g of the group G raised to an exponent equal to the product of a random value s and of the random value $a_i$ associated with the encrypted data during the encryption; and
forming the capability C comprising the random value s plus one or more of the keywords as a function of the keyed function $f$.

5. A method according to claim 4, further comprising:
storing each seed capability separately from the capabilities.

6. A method according to claim 1, comprising:
generating a keyed function $f$ and two groups $G_1$ and $G_2$, together with a generator g of group $G_1$ and an admissible bilinear map ê from $G_1 \times G_1$ to $G_2$, based on a security parameter k and generating a secret key K and a secret value a based on the keyed function $f$ as a function of the security parameter k;
encrypting the keywords for at least one keyword field of each encrypted data, comprising:
forming a first group that comprises the generator g raised to a value $a_i$ chosen uniformly at random from $Z_q$;
forming a second group that comprises, for each such keyword, the generator g raised to the product of the value $a_i$ and of the sum of the keyed function $f$ applied to the keyword and of a random value $R_{i,j}$ chosen uniformly at random from $Z_q$ for an index j of the keyword; and
forming a third group that comprises, for each such keyword, the generator g raised to the random value $a_i$, the secret value a and the random number $R_{i,j}$ uniformly chosen for the index j of the keyword; and
generating a capability C for a plurality of keywords, comprising:
forming a first group that comprises the generator g raised to a uniformly chosen random value r and the secret value a;
forming a second group that comprises the generator g raised to the uniformly chosen random value r and the secret value a and to the sum of each such keyword as a function of the keyed function $f$;
forming a third group that comprises the generator g raised to the uniformly chosen random value r; and
specifying the indices $j_i$ of the keyword fields to which the keywords belong.

7. A system for requesting a conjunctive keyword search over encrypted data, comprising:
a keyword encrypter on an user computer to encrypt a plurality of encrypted data, each data identified with an encrypted keyword vector comprising a plurality of keyword fields that each contain a keyword associated with the encrypted data;
a conjunctive keyword query comprising a plurality of encrypted keywords conjunctively combined as a plurality of parameters;
a capability generator to generate a capability for the conjunctive keyword query;
an application to send the capability to be applied exclusively to the encrypted keyword vectors and to receive an encrypted result comprised of only the encrypted data identified by the keyword vectors that satisfy the sent capability; and
an application to determine an answer to the conjunctive keyword query solely through decryption of the encrypted result.

8. A system according to claim 7, wherein each keyword in each keyword field is unique and defined as being non-empty.

9. A system according to claim 7, wherein the encrypted data associated with the encrypted keywords comprising the capability are received as the encrypted result.

10. A system according to claim 7, further comprising:
a seed capability generator to generate a seed capability for the plurality of encrypted keywords, wherein the seed capability is sent to be accessed while the capability is applied to the encrypted keywords.

11. A system according to claim 10, comprising:
a parameter generator to generate a hash function h and a keyed function $f$ and generator g of a group G where Decisional Diffie-Hellman is hard, based on a security parameter k and generating a secret key K for the keyed function $f$ as a function of the security parameter k;
wherein the keyword encrypter encrypts the keywords for the keyword fields as a generator of a group G raised to a uniformly chosen random value $a_i$ and, for each such keyword, as a function of the keyed function $f$; and
wherein the capability generator generates the capability C, wherein the seed capability Q is formed comprising a vector of size linear in the number of encrypted data with each vector element comprising the hash function h evaluated on the generator g of the group G raised to an exponent equal to the product of a random value s and of the random value $a_i$ associated with the encrypted data during the encryption, and the capability C is formed comprising the random value s plus one or more of the keywords as a function of the keyed function $f$.

12. A system according to claim 11, wherein each seed capability is stored separately from the capabilities.

13. A system according to claim 7, comprising:
a parameter generator to generate a keyed function $f$ and two groups $G_j$ and $G_2$, together with a generator g of group $G_1$ and an admissible bilinear map ê from $G_1 \times G_1$ to $G_2$, based on a security parameter k and generating a secret key K and a secret value a based on the keyed function $f$ as a function of the security parameter k;
wherein the keyword encrypter encrypts the keywords for at least one keyword field of each encrypted data, wherein a first group is formed comprising the generator g raised to a value $a_i$ chosen uniformly at random from $Z_q$, a second group is formed comprising, for each such keyword, the generator g raised to the product of the value $a_i$ and of the sum of the keyed function $f$ applied to the keyword and of a random value $R_{i,j}$ uniformly at random from $Z_q$ for an index j of the keyword, and a third group is formed comprising, for each such keyword, the generator g raised to the random value $a_i$, the secret value a and the random number $R_{i,j}$ uniformly chosen for the index j of the keyword; and
wherein the capability generator generates a capability C for a plurality of keywords, wherein a first group is formed comprising the generator g raised to a uniformly chosen random value r and the secret value a, a second group is formed comprising the generator g raised to the uniformly chosen random value r and the secret value a and to the sum of each such keyword as a function of the keyed function $f$, and a third group is formed comprising the generator g raised to the uniformly chosen random value r, and wherein the indices $j_i$ of the keyword fields to which the keywords belong are specified.

14. A method for requesting a conjunctive keyword search over encrypted data, comprising: encrypting on a computer a plurality of data, each data identified with an encrypted keyword vector comprising a plurality of keyword fields that each contains a keyword associated with the encrypted data;

defining a conjunctive keyword query comprising:
choosing a plurality of query keywords;
encrypting the chosen keywords; and
conjunctively combining the encrypted keywords as a plurality of parameters to comprise the conjunctive keyword query;

generating a capability from the conjunctive keyword query;

sending the capability to be applied exclusively to the encrypted keyword vector stored on a server, and receiving an encrypted result back from the server comprised of only the encrypted data identified by the keyword vectors that satisfy the capability; and determining an answer to the conjunctive keyword query solely through decryption of the encrypted result by the requestor.

15. A method according to claim 14, wherein each keyword in each keyword field is unique and defined as being non-empty.

16. A method according to claim 14, further comprising:
receiving the encrypted data associated with the encrypted keywords comprising the capability as the encrypted result.

17. A method according to claim 14, further comprising:
generating a seed capability for the plurality of encrypted keywords; and
sending the seed capability to be accessed while the capability is applied to the encrypted keywords.

18. A method according to claim 17, comprising:
generating a hash function h and a keyed function $f$ and generator g of a group G where Decisional Diffie-Hellman is hard, based on a security parameter k and generating a secret key K for the keyed function $f$ as a function of the security parameter k;
encrypting the keywords for the keyword fields as a generator of a group G raised to a uniformly chosen random value $_i$ and, for each such keyword, as a function of the keyed function $f$, and
generating the capability C, comprising:
forming the seed capability Q comprising a vector of size linear in the number of encrypted data with each vector element comprising the hash function h evaluated on the generator g of the group G raised to an exponent equal to the product of a random value s and of the random value $a_i$ associated with the encrypted data during the encryption; and
forming the capability C comprising the random value s plus one or more of the keywords as a function of the keyed function $f$.

19. A method according to claim 18, further comprising:
storing each seed capability separately from the capabilities.

20. A method according to claim 14, comprising:
generating a keyed function $f$ and two groups $G_1$ and $G_2$, together with a generator g of group $G_1$ and an admissible bilinear map ê from $G_1 \times G_1$ to $G_2$, based on a security parameter k and generating a secret key K and a secret value a based on the keyed function $f$ as a function of the security parameter k;

encrypting the keywords for at least one keyword field of each encrypted data, comprising:
forming a first group that comprises the generator g raised to a value $a_i$ chosen uniformly at random from $Z_q$;
forming a second group that comprises, for each such keyword, the generator g raised to the product of the value $a_i$ and of the sum of the keyed function $f$ applied to the keyword and of a random value $R_i,j$ chosen uniformly at random from $Z_q$ for an index j of the keyword; and
forming a third group that comprises, for each such keyword, the generator g raised to the random value $a_i$, the secret value a and the random number $R_{i,j}$ uniformly chosen for the index j of the keyword; and generating a capability C for a plurality of keywords, comprising:
forming a first group that comprises the generator g raised to a uniformly chosen random value r and the secret value a;
forming a second group that comprises the generator g raised to the uniformly chosen random value r and the secret value a and to the sum of each such keyword as a function of the keyed function $f$;
forming a third group that comprises the generator g raised to the uniformly chosen random value r; and
specifying the indices $j_i$, of the keyword fields to which the keywords belong.

21. A computer-readable storage medium holding code for performing the method according to claim 14.

22. A system for performing a conjunctive keyword search over encrypted data, comprising:
a plurality of encrypted data, each data identified with an encrypted keyword vector comprising a plurality of keyword fields that each contains a keyword associated with the encrypted data;
an application on a computer to receive a capability comprising a plurality of parameters defining a conjunctive keyword query for a plurality of encrypted keywords, each such encrypted keyword being encrypted for keyword fields for each of a plurality of encrypted data;
a verifier to apply the capability exclusively to the encrypted keyword vectors and to generate an encrypted result comprised of only encrypted data identified by the keyword vectors that satisfy the capability, wherein the encrypted result is sent in response to the received capability, wherein an answer to the conjunctive keyword query can be determined solely though decryption of the encrypted result.

23. A system according to claim 22, wherein each keyword in each keyword field is unique and defined as being non-empty.

24. A system according to claim 22, wherein a seed capability is generated for the plurality of encrypted keywords, wherein the seed capability is received, and wherein the seed capability is accessed while the capability is applied to the encrypted keywords.

25. A system according to claim 22, comprising:
a parameter generator to generate a hash function h and a keyed function $f$ and generator g of a group G where Decisional Diffie-Hellman is hard, based on a security parameter k and generating a secret key K for the keyed function $f$ as a function of the security parameter k;
wherein the keyword encrypter encrypts the keywords for the keyword fields as a generator of a group G raised to a uniformly chosen random value $a_i$ and, for each such keyword, as a function of the keyed function $f$, and wherein the capability generator generates the capability C, wherein the seed capability Q is formed comprising a vector of size linear in the number of encrypted data with each vector element comprising the hash function h evaluated on the generator g of the group G raised to an exponent equal to the product of a random value s and of the random value $a_i$ associated with the encrypted data during the encryption, and the capability C is formed comprising the random value s plus one or more of the keywords as a function of the keyed function $f$.

26. A system according to claim 25, wherein each seed capability is stored separately from the capabilities.

27. A system according to claim 22, comprising:
a parameter generator to generate a keyed function $f$ and two groups $G_1$ and $G_2$, together with a generator g of group $G_1$ and an admissible bilinear map ê from $G_1 \times G_1$ to $G_2$, based on a security parameter k and generating a secret key K and a secret value a based on the keyed function $f$ as a function of the security parameter k;
wherein the keyword encrypter encrypts the keywords for at least one keyword field of each encrypted data, wherein a first group is formed comprising the generator g raised to a value $a_i$ chosen uniformly at random from $Z_q$, a second group is formed comprising, for each such keyword, the generator g raised to the product of the value $a_i$ and of the sum of the keyed function $f$ applied to the keyword and of a random value $R_{i,j}$ chosen uniformly at random from $Z_q$ for an index j of the keyword, and a third group is formed comprising, for each such keyword, the generator g raised to the random value $a_i$, the secret value a and the random number $R_{i,j}$ uniformly chosen for the index j of the keyword; and
wherein the capability generator generates a capability C for a plurality of keywords, wherein a first group is formed comprising the generator g raised to a uniformly chosen random value r and the secret value a, a second group is formed comprising the generator g raised to the uniformly chosen random value r and the secret value a and to the sum of each such keyword as a function of the keyed function $f$, and a third group is formed comprising the generator g raised to the uniformly chosen random value r, and wherein the indices $j_i$ of the keyword fields to which the keywords belong are specified.

28. A method for performing a conjunctive keyword search over encrypted data, comprising: receiving on a computer a capability comprising a plurality of parameters defining a conjunctive keyword query for a plurality of encrypted keywords, each such encrypted keyword being encrypted for keyword fields for each of a plurality of encrypted data, each encrypted data comprises a plurality of the keyword fields that each contain a keyword;
generating an encrypted result comprising:
applying the capability exclusively to the encrypted data and generating the encrypted result comprised of only the encrypted data that satisfy the received capability; and
sending the encrypted result in response to the received capability, wherein an answer to the conjunctive keyword query is determined solely through decryption of the encrypted result.

29. A method according to claim 28, wherein each keyword in each keyword field is unique and defined as being non-empty.

30. A method according to claim 28, wherein a seed capability is generated for the plurality of encrypted keywords, further comprising:
receiving the seed capability; and
accessing the seed capability while the capability is applied to the encrypted keywords.

31. A method according to claim 30, comprising:
generating a hash function h and a keyed function $f$ and generator g of a group G where Decisional Diffie-Hellman is hard, based on a security parameter k and generating a secret key K for the keyed function $f$ as a function of the security parameter k;
encrypting the keywords for the keyword fields as a generator of a group G raised to a uniformly chosen random value $a_i$ and, for each such keyword, as a function of the keyed function $f$; and
generating the capability C, comprising:
forming the seed capability Q comprising a vector of size linear in the number of encrypted data with each vector element comprising the hash function h evaluated on the generator g of the group G raised to an exponent equal to the product of a random value s and of the random value $a_i$ associated with the encrypted data during the encryption; and
forming the capability C comprising the random value s plus one or more of the keywords as a function of the keyed function $f$.

32. A method according to claim 31, further comprising:
storing each seed capability separately from the capabilities.

33. A method according to claim 30, comprising:
generating a keyed function $f$ and two groups $G_1$ and $G_2$, together with a generator g of group $G_1$ and an admissible bilinear map ê from $G_1 \times G_1$ to $G_2$, based on a security parameter k and generating a secret key K and a secret value a based on the keyed function $f$ as a function of the security parameter k;
encrypting the keywords for at least one keyword field of each encrypted data, comprising:
forming a first group that comprises the generator g raised to a value $a_i$ chosen uniformly at random from $Z_q$;
forming a second group that comprises, for each such keyword, the generator g raised to the product of the value $a_i$ and of the sum of the keyed function $f$ applied to the keyword and of a random value $R_{i,j}$ chosen uniformly at random from $Z_q$ for an index j of the keyword; and
forming a third group that comprises, for each such keyword, the generator g raised to the random value $a_i$, the secret value a and the random number $R_{i,j}$ uniformly chosen for the index j of the keyword; and
generating a capability C for a plurality of keywords, comprising:
forming a first group that comprises the generator g raised to a uniformly chosen random value r and the secret value a;
forming a second group that comprises the generator g raised to the uniformly chosen random value r and the secret value a and to the sum of each such keyword as a function of the keyed function $f$;
forming a third group that comprises the generator g raised to the uniformly chosen random value r; and
specifying the indices $j_i$ of the keyword fields to which to the keywords belong.

34. A computer-readable storage medium holding code for performing the method according to claim 28.

* * * * *